United States Patent Office 2,952,091
Patented Sept. 13, 1960

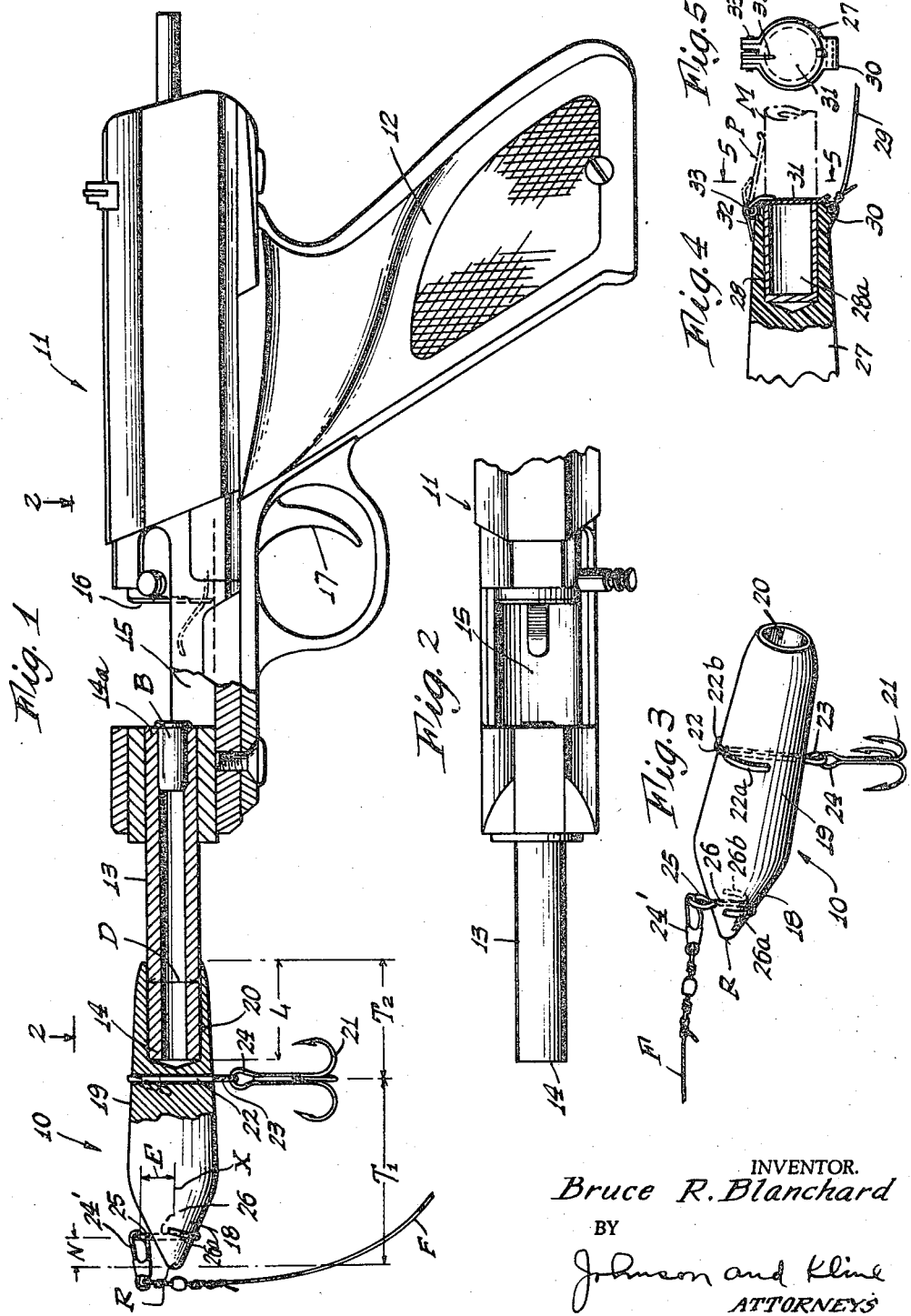

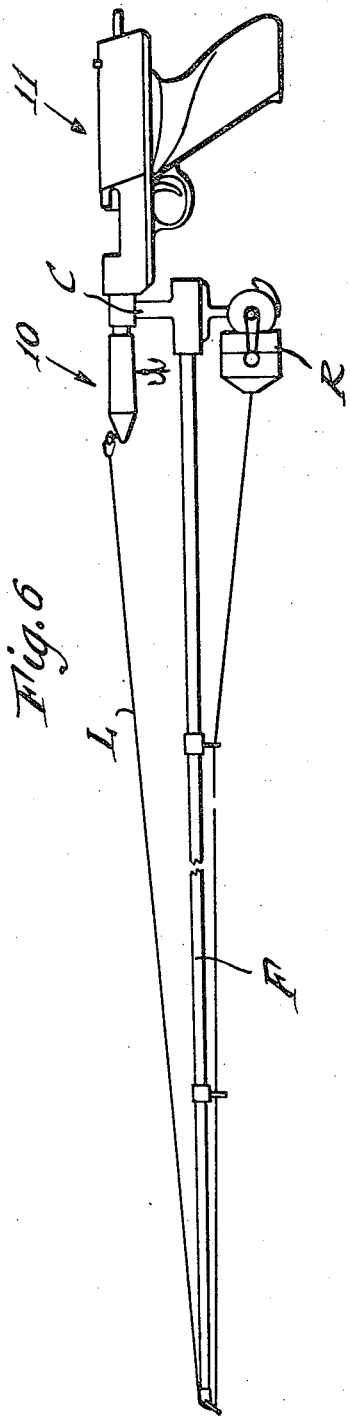

2,952,091

DEVICE FOR CASTING FISHING LURE

Bruce R. Blanchard, 35 Hawthorne St., Derby, Conn.

Filed Aug. 20, 1957, Ser. No. 679,169

4 Claims. (Cl. 43—19)

This invention relates to fishing gear and more particularly to improvements in devices for casting a fishing lure attached to a fishing line that may be payed out and hauled in by the operation of a reel attached to a fishing rod.

The object is to eliminate the effort and special skill required as well as the inconvenience or risk incurred when casting with a rod in the usual manner from shore or from a boat, when it is desired to have the lure projected in a desired direction as far as possible by the skillful manipulation of the rod.

Consequently it is an object to provide auxiliary casting and lure propelling means with a lure specially suited for the improved casting operation whereby the lure can be projected accurately in the desired direction and to a maximum practical distance. In this way the invention eliminates the conventional manipulation in casting whereby the rod must be swung in a wide arc for imparting momentum to the lure, while the reel or the line must be released at the proper point of the swing to allow the line to pay out smoothly as the lure follows the course of a longer or shorter trajectory depending on the operator's skill.

In unskilled hands this casting operation may become precarious inasmuch as the cast may be ill-timed and the lure and the line may be released too soon or too late so that it may become fouled, endangering others, or the cast may be ill-aimed and ineffective, or the effort may be such as to unbalance the caster fishing from a small boat.

In one embodiment exemplary of this invention the lure is in the form of an elongated body of any desired shape having a coaxial bore forming a socket adapted to receive and to fit snug over and around the muzzle end of a firearm or gun, so that when a blank cartridge is fired from the gun, the gases from the fired cartridge will propel the lure with the line connected thereto in a lure casting operation. In this way, without requiring the aforementioned skill and exertion, the lure can be aimed in a desired direction and be propelled to follow the coure of a desired trajectory independent of the manipulation of the fishing rod.

Features of this invention provide special means for minimizing drag upon the lure while same is being pulled through the water. According to one form of the invention the line is attached to the forward or nose portion of the lure so that drag due to the open bore at the rear end portion is avoided. In another form of the invention the line is attached adjacent to the end portion of the lure having the bore, with the addition of spring-urged closure means which becomes automatically operative to close the opening of the bore after the lure has been propelled by the gun.

Other features and advantages will hereinafter appear.

In the drawings:

Figure 1 shows the lure in one embodiment thereof fitted over the muzzle end of the gun, with the firing chamber about to be closed in preparation to having the lure projected by the firing of the gun.

Fig. 2 is a partial top view of the gun taken on line 2—2 of Fig. 1 with the lure detached.

Fig. 3 is a perspective detailed view of the lure as embodied in Fig. 1, as the lure is being pulled through the water by the tug of the line acting upon the forward end thereof.

Fig. 4 is a fragmentary longitudinal part sectional view of another embodiment of the lure provided with rear end closure means for the bore.

Fig. 5 is an end view taken on line 5—5 of Fig. 4.

Fig. 6 is a view showing a fishing rod secured to the firearm.

In the accompanying drawings the lure projecting means of this invention are exemplified in a combination in which a lure 10 is in the shape of an elongated projectile-shaped cap member fitted snugly although slidably over and around the muzzle end of the barrel of a firearm 11 herein exemplified by a pocket size gun. The gun as herein illustrated comprises a usual gun butt with handle 12, a barrel 13 having a muzzle end portion 14 and an inner or breech end portion 14ᵃ for receiving a blank cartridge B, a firing chamber 15 with the usual breech block or bolt 16 operable by the user to close the firing chamber after the blank cartridge has been placed in the barrel as shown. Pulling the trigger 17 actuates a usual percussion mechanism whereby the blank cartridge may be fired.

The lure 10 may have any desirable shape and may be made of metal, plastic or the like material and suitably weighted. In the embodiment of Fig. 1 it is formed of die cast aluminum in the shape of an elongated streamlined projectile-shaped body having a conically pointed nose or front end portion 18 and a slightly tapered longer rear end portion 19 provided with a coaxial rearwardly open bore 20 therein. The bore can be of a length L and of a diameter D dimensioned to snugly and tightly and yet slidably embrace the tubular muzzle end portion of the gun. The extent of the length, and the degree of tightness in the fit of the bore upon the barrel may vary to suit conditions and characteristics of the gun and of the lure with respect to the effect which it is desired to attain.

One or more multi-pronged fish hooks 21 may be carried by the lure at intermediate points between the ends thereof. The attachment may be to a separate fastener as shown in Fig. 3 or to an eye formed integrally with the body as shown in Fig. 4. The fastener, as illustrated, is a cotter pin 22 diametrically penetrating the body of the lure, with the eye portion 23 of the cotter pin passing through the eye portion 24 of the hook, and the bent over end portion 22ᵃ and 22ᵇ securing the cotter pin in place. While the cotter pin carrying the hook is herein shown spaced a longer distance $T_1$ from the tip R of the lure and a shorter distance $T_2$ from the rear end of the lure, the location of the point of attachment of the hook to the lure may be varied. Similarly the line may be connected to the lure by a fastener or an integral eye.

In the embodiment of Fig. 3 the fishing line F is attached to the front end of the lure by means of a snap hook 24' passing through the eye portion 25 of a second cotter pin 26 traversing the nose portion of the lure, and secured in place by the bent over end portion 26ᵃ and 26ᵇ of the cotter pin. In this embodiment, therefore, the actual point of attachment of the line to the lure is spaced a distance N rearward from the tip R of the lure, as well as spaced a distance E laterally from the longitudinal axis X of the lure. This distance may be varied in accordance with the desired action of the lure since the further the line is away from the tip R the greater will be the zigzag movement of the lure as it is pulled through the water.

Another embodiment of the lure as shown in Figs. 4 and 5 comprises a body 27 (fragmentarily shown since it may be generally similar to the embodiment of Fig. 1) formed of plastic material and including a coaxial rearwardly open bore 28 having a metal liner 28ª therein. In this form of the invention the fishing line 29 is attached to the rear end of the lure as by means of an eye 30 here shown integral with the lure, so that the pull of the line will be exerted upon the trailing end thereof, in order that the lure may follow more closely the theoretical course of its trajectory. In addition, since this lure will be pulled through the water by the line with the rear end first, such drag as would ensue from the obstruction of the water head-on entering the bore is herein eliminated by the provision of a swingable hinged closure member 31 pivotally mounted upon the rear end of the lure. This closure member is biased by a spring 32 for automatically closing the open end of the bore when the lure becomes detached from the barrel of the gun. The closure member having a pivotal connection 33 with the rear end of the lure is held open against spring pressure in the dot-and-dash line position P indicated in Fig. 4 as long as the muzzle end of the gun barrel M indicated in dot-and-dash will occupy the bore. When the gun is fired propelling the lure leading the line through its trajectory the bore 28 is automatically covered by the closure member with the result that drag is minimized when the lure is again hauled in through the water rear end first.

In use, the lure casting means of the present invention can be secured by clamps C or other means to a fishing pole F, as shown in Fig. 6, having a spinning reel R thereon to receive the line L or the projecting means may be formed as a separate hand-held firearm device which can be held in one hand while the rod and reel are held in the other hand and which, as soon as the lure is projected from the firearm, can be positioned in a holster or the like supporting means to permit the use of both hands on the rod and reel.

Variations and modifications may be made within the scope of the claims and portions of the improvements may be used without others.

I claim:

1. In a device for casting a fishing lure attached to a fish line, the combination of a firearm having a firing chamber adapted to fire a blank cartridge and a barrel connected thereto, a fish lure having a bore in an end thereof and a line connected thereto adjacent the bore, a spring pressed pivoted closure mounted on the lure to overlie the open end of said bore, said bore when said closure is lifted slidably receiving and closely embracing the end of the barrel whereby the gases from the fired cartridge propel the lure and project it and the line connected thereto in a lure casting operation, said closure closing the bore and preventing water from entering the bore and forming a drag on the lure while being pulled through the water by the line.

2. A fish lure adapted to connected to a fish line and to be projected from a muzzle of a firearm during a casting operation comprising an elongate body having a bore therein at one end thereof to form a socket to receive the muzzle of said firearm and having means thereon to secure the fish line thereto, hook means connected to the body to project therefrom, said socket being adapted to fit closely over the muzzle whereby gases generated during the firing of the firearm propel the lure during said casting operation, and a spring pressed pivoted closure member mounted on the lure to overlie the open rear end of said bore, with means for connecting the line to the rearward end thereof, adjacent the bore, said closure member being adapted to be lifted for the reception of the muzzle and to automatically close the bore to prevent water exerting a drag on the bore while being pulled through the water by the line.

3. A lure casting device which comprises in combination a fishing lure comprising an elongate body having means adjacent its front end to be attached to a line carried by a fishing pole and a reel for paying out and hauling in the line, a firearm detachably connected to said pole, said firearm having a firing chamber and adapted to fire a blank explosive cartridge and having a barrel extending from the firing chamber, the lure having hook means secured to the body forwardly of the rear end and having a longitudinally disposed elongate axial bore in the rear thereof and extending for a portion of the length of the lure, said bore opening in the rear end and being of a diameter to constitute an elongated cap structure therefor to receive and be propelled by the gases from the fired cartridge to project the lure and the line connected thereto in a lure casting operation.

4. The invention as defined in claim 3 wherein said lure is formed of plastic material and has a metal liner in the bore thereof to receive the muzzle of the firearm.

References Cited in the file of this patent

UNITED STATES PATENTS

| 348,849 | Ingersoll | Sept. 7, 1886 |
| 2,103,222 | Nelson | Dec. 21, 1937 |
| 2,605,569 | Kronhaus | Aug. 5, 1952 |
| 2,671,289 | McCullough | Mar. 9, 1954 |
| 2,703,945 | Johnson | Mar. 15, 1955 |
| 2,811,805 | McGee | Nov. 5, 1957 |
| 2,817,178 | Keck | Dec. 24, 1957 |